United States Patent [19]

Novak

[11] Patent Number: 5,866,908
[45] Date of Patent: Feb. 2, 1999

[54] REFLECTOR COMPENSATION FOR SCINTILLATOR ARRAY WITH LOW TEMPERATURE EXPANSION

[75] Inventor: William P. Novak, Middlefield, Ohio

[73] Assignee: Saint-Gobain/Norton Industrial Ceramics Corporation, Worcester, Mass.

[21] Appl. No.: 789,730

[22] Filed: Jan. 27, 1997

Related U.S. Application Data

[60] Provisional application No. 60/011,972 Feb. 20, 1996.
[51] Int. Cl.⁶ ...................................................... G01T 1/20
[52] U.S. Cl. ............................................ 250/368; 250/367
[58] Field of Search ..................................... 250/367, 368, 250/483.1, 486.1, 487.1, 370.11

[56] References Cited

U.S. PATENT DOCUMENTS

| | | | |
|---|---|---|---|
| 4,292,538 | 9/1981 | Carlson | 250/367 |
| 4,694,177 | 9/1987 | Akai | 250/368 |
| 5,276,328 | 1/1994 | Yoshida et al. | 250/368 |
| 5,300,782 | 4/1994 | Johnston et al. | 250/363.03 |

FOREIGN PATENT DOCUMENTS

| | | | |
|---|---|---|---|
| 62-135787 | 6/1987 | Japan | 250/363.03 |

*Primary Examiner*—Constantine Hannaher
*Assistant Examiner*—Darren M. Jiron
*Attorney, Agent, or Firm*—Volker R. Ulbrich

[57] ABSTRACT

Output variations of individual channels of radiation detector arrays and particularly the outer channels of the scintillator crystal array are reduced by modifying the reflectivity of the surfaces of the individual crystal elements according to the output. This is accomplished by creating a specific difference in the reflectivity of the internal channel reflectors compared to the external reflector material to enhance or reduce the output of specific channels to achieve a balance in the outputs. The specific difference in reflectivity may be obtained by using different color pigments, different color cements and various colored foils, for example.

20 Claims, 1 Drawing Sheet

REFLECTOR COMPENSATION FOR SCINTILLATOR ARRAY WITH LOW TEMPERATURE EXPANSION

This application claims the benefit of U.S. Provisional Application No.: 60/011972 FILING DATE Feb. 20, 1996.

The invention herein described relates generally to radiation imaging systems and more particularly to a scintillator array for use in such systems.

BACKGROUND AND SUMMARY OF THE INVENTION

Radiation imaging systems are widely used for medical and industrial purposes, such as for computer tomography (CT) and luggage scanning. Imaging systems have been developed that use detected radiation to produce a signal which can be used to operate a visual display device or which can be used for other analyses of the pattern of detected radiation such as x-ray or gamma radiation. In such systems the radiation is typically absorbed in a scintillator material, resulting in generation of photons of light. Light photons emanating from the scintillator are detected by photodetectors to generate an electrical output signal that can be processed to drive the display or analysis system.

Scintillator arrays or blocks heretofore have been composed of several individual crystal elements assembled with reflectors between the crystal elements. The crystal elements were optically coupled to PIN diode arrays to form individual detector arrays composed of multiple channels (a crystal element and photodiode together form a "channel" that produces an output for processing along with the outputs of the other "channels"). These detector arrays were then placed in groups of several arrays such that the resulting matrix acts as a single array.

One known method of forming a scintillator array involved attaching a reflector to each internal surface of the crystal elements and then bonding them together. The outside surfaces of the thus bonded assembly were then covered with reflector material to finish the array.

Another method involved the use of the bonding material as the reflector between the individual crystal elements. One such bonding material was Eccobond 45 clear epoxy adhesive available from Emerson & Cuming, Inc. of Woburn, Mass., USA. The Eccobond 45 mixed with a catalyst 15 clear curing agent or hardener had an amber color. To improve the reflective properties of the epoxy adhesive, the Eccobond 45 was doped with titanium oxide with this yielding an off-white color interface material that was suitable for use in forming the crystal array. The outside surfaces of the bonded assembly were then covered with a reflective paint to finish the crystal array. In the resulting detector array (the crystal array with the photodiodes assembled thereto), the variation in outputs of each channel was good, i.e., within ±5%.

The detector arrays formed from crystal blocks using the Eccobond 45 were found to be unacceptable because of high expansion rates in applications where the detector arrays encountered large temperature excursions including those that crossed the glass transition temperature of the epoxy adhesive. The problem arose from the relatively low thermal expansion of the crystal element composed, for example, of $CdWO_4$ compared to the epoxy adhesive, and the fact that the bond between the epoxy and adjacent surfaces of the crystal element restrict the volumetric expansion of the epoxy interface layer in two geometric dimensions such that most expansion occurs in the third dimension. The result is possible damage to the detector arrays and unacceptable stress on the optical coupling between the crystal elements and photodiodes.

A discovery was made of another epoxy that had an expansion rate closer to that of the scintillator crystal. This epoxy was Eccobond 24 water clear epoxy adhesive available from Emerson & Cuming, Inc. when mixed with Catalyst 9 instead of the intended Eccobond 24 Part B catalyst. The Eccobond 24 was doped with titanium oxide to produce a white material having a lower expansion rate, higher glass transition temperature and higher reflectivity than the above mentioned doped Eccobond 45 epoxy adhesive. Those skilled in the art would view the higher reflectivity as being desirable in that it increases the number of photons that are detected by the photodiode. However, it was found that the end channels of the detector arrays generally had a substantially lower output than the inner channels. This phenomena also has been found to occur in other detector arrays using different reflectors than the aforesaid low expansion rate epoxy adhesive. Typical variations in output of ±15% are not uncommon in the industry.

The present invention provides a solution to the problem of low end channel output in detector arrays that otherwise would exhibit such phenomena. According to the invention, the output variations of individual channels and particularly the outer channels of a scintillator crystal or detector array are reduced by modifying the reflectivity of the surfaces of the individual crystal elements according to the output. This is accomplished by creating a specific difference in the reflectivity of the internal channel reflectors compared to the external reflector material to enhance or reduce the output of specific channels to achieve a balance in the outputs. The specific difference in reflectivity may be obtained by using different color pigments, different color cements and various colored foils, for example.

According to one aspect of the invention, there is provided a scintillator array comprising plural scintillator elements assembled side-by-side with inner reflectors interposed between the sides of relatively adjacent scintillator elements, and outer reflectors at the outermost sides of the outer scintillator elements between which one or more inner scintillator elements are sandwiched. The inner reflectors include an epoxy adhesive adhered to the sides of the relatively adjacent scintillator elements, the epoxy adhesive has a glass transition temperature greater than 80° C, and the inner reflectors and outer reflectors have respective reflectivities providing an output variation between the outer scintillator elements and the inner scintillator elements of no greater than about ±10%, and more preferably no greater than about 5%.

In a preferred embodiment, the outer reflectors are formed by a reflective coating, for example a paint, on the outermost sides of the outer scintillator elements which are scintillation crystals. The inner reflectors further include a pigment in the epoxy adhesive to increase the reflectivity of the epoxy adhesive, and the epoxy adhesive is formed from an epoxy resin and two catalysts, one catalyst being clear and composed at least in part of tetraethylene pentamine, triethylene tetramine and pentaethylene hexamine, and the other catalyst being colored and composed of m-phenylene diamine and n-methyl pyrrolidone. Plural photodiodes may be optically coupled to the scintillator elements to form a detector array.

According to another aspect of the invention, there is provided a method for compensating between variations in outputs of individual scintillator elements of a scintillator array wherein the scintillator elements are assembled together side-by-side with inner reflectors interposed between the sides of relatively adjacent scintillator elements and outer reflectors at the outermost sides of the outer scintillator elements between which one or more inner scintillator elements are sandwiched. The method is characterized by the step of modifying the reflectivity of the reflectors to reduce any output variation between the scintillator elements to no greater than about ±10%.

According to a preferred method, the modifying step includes using different color reflective materials for the inner and outer reflectors. The preferred method further includes the step of using an epoxy adhesive to form the inner reflectors and further to bond together the relatively adjacent scintillator elements. The epoxy adhesive preferably has a glass transition temperature greater than 80° C., and the modifying step may include selecting the inner and outer reflectors such that they have respective reflectivities providing an output variation between the outer scintillator elements and the inner scintillator elements of no greater than about ±5%. The method also may include the step of applying a reflective coating to the outermost sides of the outer scintillator elements to form the outer reflectors, and the epoxy adhesive may be formed from an epoxy resin and a first catalyst composed at least in part of tetraethylene pentamine, triethylene tetramine and pentaethylene hexamine and a second catalyst composed of m-phenylene diamine and n-methyl pyrrolidone.

The foregoing and other features of the invention are hereinafter fully described and particularly pointed out in the claims, the following description and the annexed drawings setting forth in detail a certain illustrative and preferred embodiment of the invention, this being indicative, however, of but one of the various ways in which the principles of the invention may be employed.

DETAILED DESCRIPTION

Figure 1:
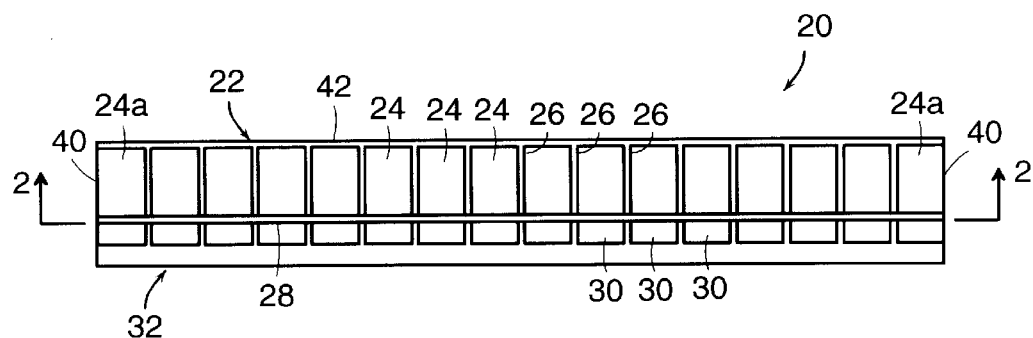
FIG. 1 is a schematic cross-sectional view of a detector array according to the present invention.
Figure 2:
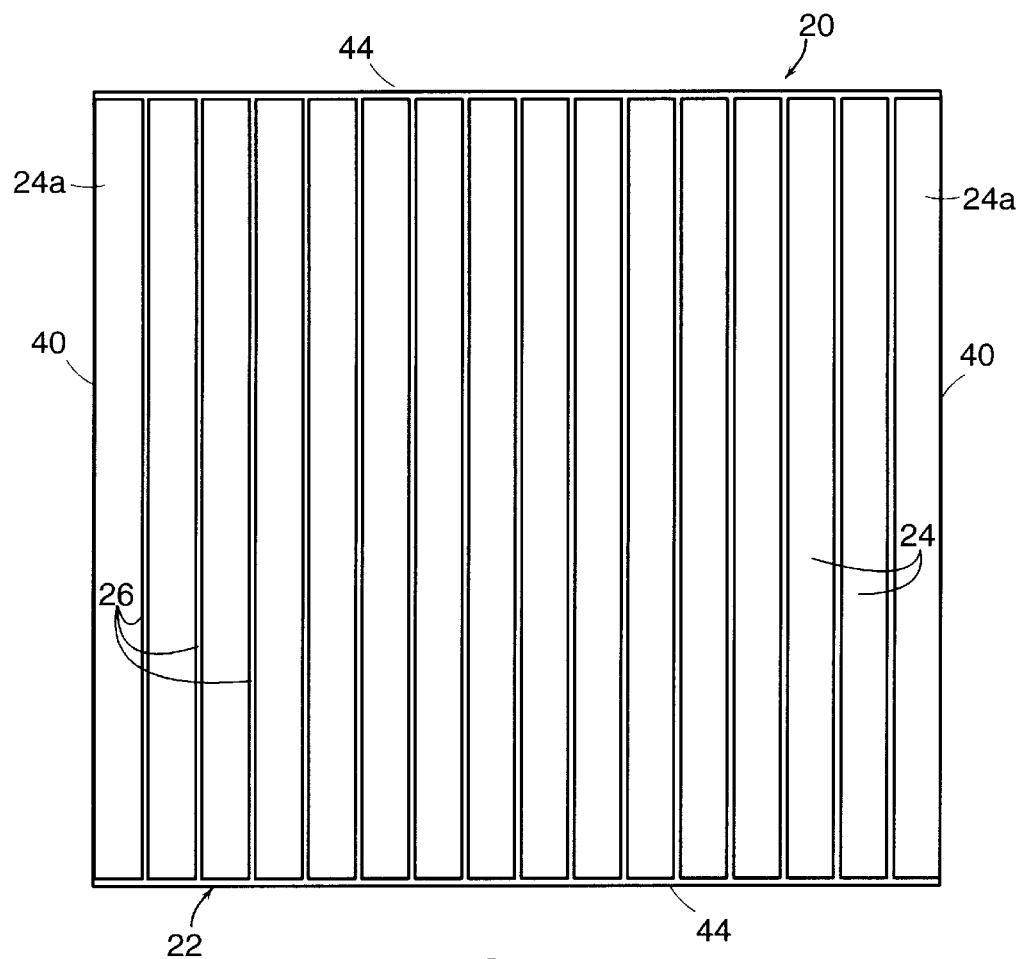
FIG. 2 is a plan view of a scintillator array used in the detector array of FIG. 1, looking from the line 2—2 thereof.

Referring now in detail to FIGS. 1 and 2, a radiation detector array 20 comprises a scintillator array 22 composed of several individual scintillator elements 24, such as $CdWO_4$ crystals, that are assembled with inner reflectors 26 between the scintillator elements. The scintillator elements are optically coupled at an optical interface 28 to respective photodiodes 30 of a photodiode array 32 which, for example, may be a PIN diode array. Each optically coupled scintillator element and photodiode forms a photodetector or "channel" that produces an electrical signal related to radiation that interacts with the scintillator element to produce scintillations, i.e., photons. The detector array may be coupled to a processing circuit which processes the electrical signals. A plurality of detector arrays 20 may be placed in groups to form a matrix useful, for example, in radiation imaging devices such as CT imaging systems.

The scintillator elements are arranged side-by-side to form an array pattern such as a row as illustrated. In the illustrated embodiment, the scintillator elements are equal length crystals having orthogonally disposed side and end surfaces. The inner reflectors 26 are interposed between relatively adjacent side surfaces of the scintillator elements. Preferably, the inner reflectors are formed of an epoxy adhesive that not only is reflective but which also bonds the scintillator elements together. However, other constructions may be employed, as such those wherein a reflective material is attached or applied to each internal side surface of the scintillator elements and then the scintillator elements 24a are bonded together. The invention may be applied to scintillator arrays comprising at least three, and generally more than 8, such as 16 in the illustrated example.

The scintillator array 22 also includes outer side reflectors 40 covering the outer side surfaces of the outer scintillator elements 24a of the array 22, an outer front reflector 42 covering the sides of the scintillator elements opposite the photodiode array 32, and outer end reflectors 44 covering the ends of the scintillator elements. The reflectors function to reflect the photons attempting to exit the scintillator elements through the adjacent sides thereof back into the scintillator elements ultimately for exiting out of the rear sides thereof that are optically coupled to the photodiodes for detection by the photodiodes.

In a typical matrix of photodetector arrays, the outer side reflectors 40 often do not have as much space for reflector material as the inner reflectors because of tolerance requirements. Consequently, a relatively thin coating of reflector material is applied, as by painting, to the outer side reflectors. This same coating preferably is applied to the assembled array of scintillator elements to form the outer front reflector 42 and the outer end reflectors 44 which may be thicker because they are not subject to the same tolerance restrictions as the outer side reflectors 40. The outer reflector material preferably is white and may be of any suitable type such as that previously used in the art to cover the outer sides of similar scintillator arrays. The inner reflectors interposed between the scintillator elements preferably are of equal thickness which, as above indicated, is typically greater than the thickness of the outer side reflectors.

The inner reflectors preferably are made of an epoxy including a reflectivity enhancing additive such as a white pigment and more particularly titanium oxide ($TiO_2$) by way of specific preferred example. A preferred epoxy is an epoxy adhesive having a glass transition temperature greater than about 80° C. The epoxy adhesive is formed from mixing an epoxy resin with a catalyst as a curing or hardening agent. The catalyst according to a preferred embodiment of the invention is composed of a clear catalyst and a reflectivity compensating colored catalyst. The proportion of the compensating catalyst may be selected to obtain more uniform output of the scintillator elements and, more particularly, to reduce the difference in response of the outer and inner channels, and still more particularly the difference in the outputs of the outer scintillator elements and the outputs of the inner scintillator elements when exposed to the same radiation.

A preferred epoxy adhesive is formed from Eccobond 24 epoxy resin from Emerson & Cuming, Inc. of Woburn, Mass., USA. The Eccobond is mixed with Emerson & Cuming Catalyst 9 which is clear and composed of tetraethylene pentamine (60–70% by weight), triethylene tetramine (20–30% by weight) and pentaethylene hexamine (10%), and with a significantly smaller amount of Emerson & Cuming Catalyst 11 which has a dark brown color and is composed of m-phenylene diamine (70–80% by weight) and n-methyl pyrrolidone (20–30% by weight). Preferably, the mixture contains 50–70% by weight Eccobond 24 (or equivalent), 3–10% by weight Catalyst 9 (or equivalent), 30–50% by weight titanium oxide pigment (or equivalent) and 1–5% by weight Catalyst 11 (or equivalent). By way of more specific example the epoxy adhesive may be formed from a mixture of 10 grams Eccobond 24, 1 gram Catalyst 9, 8 grams titanium oxide pigment and 6 eyedropper drops (0.25 grams) of Catalyst 11. Preferably the mixture is evacuated to remove entrapped air prior to use.

As above indicated, variations in outputs of individual scintillator elements of a scintillator array may be compensated for by modifying the reflectivity of the reflectors to reduce any output variation between the scintillator elements to no greater than about ±10% and more preferably no greater than ±5%. This modifying or compensating step includes using different color reflective materials for the inner and outer reflectors.

The scintillator array may be assembled in any suitable manner. However, in accordance with the preferred embodiment of the invention, the reflectivity of the inner reflectors is adjusted, as by adding a non-white colored component to the epoxy blend, to reduce the output variation between the outer scintillator elements and the inner scintillator elements to no greater than about ±10% and more preferably no greater than about ±5%.

It is noted that the references herein to reflectivity are made in relation to the light emitted by the scintillator elements. The reflector material of the inner reflectors preferably is an off white.

Although the invention has been shown and described with respect to a preferred embodiment, equivalent alterations and modifications will occur to others skilled in the art upon the reading and understanding of this specification. As will be appreciated by those skilled in the art, other compensating techniques may be employed, such as using different colored foils as the inner reflectors. The present invention includes all such equivalent alterations and modifications.

What is claimed is:

1. A scintillator array comprising plural scintillator elements assembled side-by-side with inner reflectors interposed between the sides of relatively adjacent scintillator elements, said plural scintillator elements including outer scintillator elements and at least one inner scintillator element sandwiched between the outer elements; and outer reflectors at the outermost sides of the outer scintillator elements; and wherein the inner reflectors include an epoxy adhesive adhered to the sides of the relatively adjacent scintillator elements, the epoxy adhesive has a glass transition temperature greater than 80° C., and the inner reflectors and outer reflectors have respective reflectivities providing an output variation between the outer scintillator elements and the at least one inner scintillator element of no greater than about ±10%.

2. A scintillator array as set forth in claim 1, wherein the inner reflectors and outer reflectors have respective reflectivities providing an output variation between the outer scintillator elements and the at least one inner scintillator element of no greater than about ±5%.

3. A scintillator array as set forth in claim 1, wherein the outer reflectors are reflective coatings on the outermost sides of the outer scintillator elements, and the reflective coatings have a thickness less than the thickness of the inner reflectors.

4. A scintillator array as set forth in claim 1, wherein the scintillator elements are scintillation crystals.

5. A scintillator array as set forth in claim 1, wherein the inner reflectors further include a pigment in the epoxy adhesive to increase the reflectivity of the epoxy adhesive.

6. A scintillator array as set forth in claim 5, wherein the epoxy adhesive is formed from an epoxy resin and a catalyst composed at least in part of tetraethylene pentamine, triethylene tetramine and pentaethylene hexamine.

7. A scintillator array as set forth in claim 6, wherein the catalyst further comprises m-phenylene diamine and n-methyl pyrrolidone.

8. A scintillator array as set forth in claim 5, wherein the epoxy adhesive is formed from an epoxy resin, a first catalyst and a second catalyst having a color different than the first catalyst.

9. A scintillator array as set forth in claim 8, wherein the first catalyst is clear and the second catalyst has a color operative to reduce the reflectivity of the inner reflectors.

10. A detector array comprising the scintillator array of claim 1 and plural photodiodes optically coupled to the scintillator elements, respectively.

11. A method for compensating between variations in outputs of individual scintillator elements of a scintillator array wherein the scintillator elements are assembled together side-by-side with inner reflectors interposed between the sides of relatively adjacent scintillator elements and outer reflectors at the outermost sides of the outer scintillator elements between which at least one inner scintillator element is sandwiched, the method comprising the step of selectively modifying the reflectivity of the reflectors of the individual scintillator elements to reduce any output variation between the scintillator elements to no greater than about ±10%.

12. A method as set forth in claim 11, wherein the modifying step includes using different color reflective materials for the inner and outer reflectors.

13. A method as set forth in claim 11, including the step of using an epoxy adhesive to form the inner reflectors and further to bond together the relatively adjacent scintillator elements.

14. A method as set forth in claim 13, wherein the epoxy adhesive has a glass transition temperature greater than 80° C.

15. A method as set forth in claim 14, wherein the modifying step includes selecting the inner and outer reflectors such that they have respective reflectivities providing an output variation between the outer scintillator elements and the at least one inner scintillator element of no greater than about ±5%.

16. A method as set forth in claim 13, including the step of applying a reflective coating on the outermost sides of the outer scintillator elements to form the outer reflector with a thickness less than the thickness of the inner reflectors.

17. A method as set forth in claim 13, wherein the epoxy adhesive is formed from an epoxy resin and a catalyst composed at least in part of tetraethylene pentamine, triethylene tetramine and pentaethylene hexamine.

18. A method as set forth in claim 17, wherein the catalyst further comprises m-phenylene diamine and n-methyl pyrrolidone.

19. A method as set forth in claim 13, wherein the epoxy adhesive is formed from an epoxy resin, a first catalyst and a second catalyst having a color different than the first catalyst.

20. A method as set forth in claim 19, wherein the first catalyst is clear and the second catalyst has a color operative to reduce the reflectivity of the inner reflectors.

* * * * *